United States Patent
Ueno et al.

(10) Patent No.: US 9,728,975 B2
(45) Date of Patent: Aug. 8, 2017

(54) POWER SUPPLY UNIT THAT OUTPUTS ELECTRIC POWER TO A LOAD TOGETHER WITH ANOTHER POWER SUPPLY UNIT

(71) Applicant: Kabushiki Kaisha Toshiba, Minato-ku (JP)

(72) Inventors: Takeshi Ueno, Kawasaki (JP); Tetsuro Itakura, Tokyo (JP); Takafumi Sakamoto, Tokyo (JP); Toshihisa Nabetani, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 948 days.

(21) Appl. No.: 13/960,030

(22) Filed: Aug. 6, 2013

(65) Prior Publication Data

US 2014/0046497 A1 Feb. 13, 2014

(30) Foreign Application Priority Data

Aug. 13, 2012 (JP) .................................. 2012-179493

(51) Int. Cl.
  H02J 4/00 (2006.01)
  H02J 13/00 (2006.01)
(52) U.S. Cl.
  CPC ............ *H02J 4/00* (2013.01); *H02J 13/0075* (2013.01); *Y02B 90/2653* (2013.01); *Y04S 40/126* (2013.01)
(58) Field of Classification Search
  None
  See application file for complete search history.

(56) References Cited

U.S. PATENT DOCUMENTS 7,839,014 B2 11/2010 Winter et al.

FOREIGN PATENT DOCUMENTS

JP 10-201105 7/1998
JP 2009-521195 5/2009

OTHER PUBLICATIONS

Japanese Office Action issued Aug. 8, 2014, in Japan Patent Application No. 2012-179493 (with English translation).
Mohammad N. Marwali et al. "Control of Distributed Generation Systems-Part II: Load Sharing Control", IEEE Transactions on Power Electronics, vol. 19, No. 6, Nov. 2004 , pp. 1551-1561.

(Continued)

*Primary Examiner* — Eric C Wai
(74) *Attorney, Agent, or Firm* — Oblon, McClelland, Maier & Neustadt, L.L.P.

(57) ABSTRACT

According to some embodiments, there is provided a controller that performs communication with a plurality of power supply units each of which outputs electric power to a load. The controller includes a receiving unit, a control information generating unit and a transmitting unit. The receiving unit receives operation information from the power supply units by radio, the operation information being information on electric power output to the load from the power supply units, respectively. The control information generating unit generates control information to control the power supply units based on the operation information. The transmitting unit transmits the control information to the power supply units by radio.

11 Claims, 6 Drawing Sheets

(56) References Cited

OTHER PUBLICATIONS

Kaustuva Acharya et al. "Communication Fault-tolerant Wireless Network Control of a Load-sharing Multiphase Interactive Power Network", IEEE Power Electronics Specialists Conference, 2006 8 pages.

Yao Zhang et al. "Theoretical and Experimental Investigation of Networked Control for Parallel Operation of Inverters", IEEE Transactions on Industrial Electronics, vol. 59, No. 4, Apr. 2012, pp. 1961-1970.

POWER SUPPLY UNIT THAT OUTPUTS ELECTRIC POWER TO A LOAD TOGETHER WITH ANOTHER POWER SUPPLY UNIT

CROSS REFERENCE TO RELATED APPLICATIONS

This application is based upon and claims the benefit of priority from the prior Japanese Patent Application No. 2012-179493, filed on Aug. 13, 2012, the entire contents of which are incorporated herein by reference.

FIELD

The embodiments of the present invention are related to a controller, a power supply unit, and a power supply system.

BACKGROUND

When a plurality of power supply units such as inverters are connected to each other in parallel, and electric power is supplied from the power supply units to a common load, it is necessary that a balance of electric power that is output from the power supply units be secured.

Conventionally, in the electric power balance of the power supply units, it is common that droop control is used that controls an output frequency "ω" based on active power P and output voltage "V" based on reactive power "Q", on the basis of information on the active power "P" and the reactive power "Q" in the output of the power supply unit.

In the droop control, communication between the power supply units is not needed, and there is an advantage that each of the power supply units can adjust the output electric power autonomously, however, it is difficult to secure the desirable electric power balance due to of the effect of power line impedance.

On the other hand, a method is known by which an electric power balance is improved by transmitting and receiving average values of active power and reactive power that are output from the power supply units between the power supply units by wired communication each other.

In addition, a method in known in which communication between the power supply units is performed by a mesh network using radio. In this method, each of the power supply units grasps communication paths between all nodes that constitute the mesh network, and communication using the shortest path is always performed by updating path information periodically. As a result, communication having high reliability can be performed.

In the above-described method using the wired communication, there is a problem that cost for laying a communication line between the power supply units that are installed at a distance from each other increases. In addition, in the method using the radio communication by the mesh network, there is a problem that the processing becomes complicated.

DETAILED DESCRIPTION

According to some embodiments, there is provided a controller that performs communication with a plurality of power supply units each of which outputs electric power to a load.

The controller includes a receiving unit, a control information generating unit and a transmitting unit.

The receiving unit receives operation information from the power supply units by radio, the operation information being information on electric power output to the load from the power supply units, respectively.

The control information generating unit generates control information to control the power supply units based on the operation information; and The transmitting unit transmits the control information to the power supply units by radio.

The embodiments of the present invention are described in detail with reference to the accompanying drawings.

First Embodiment

Figure 1:
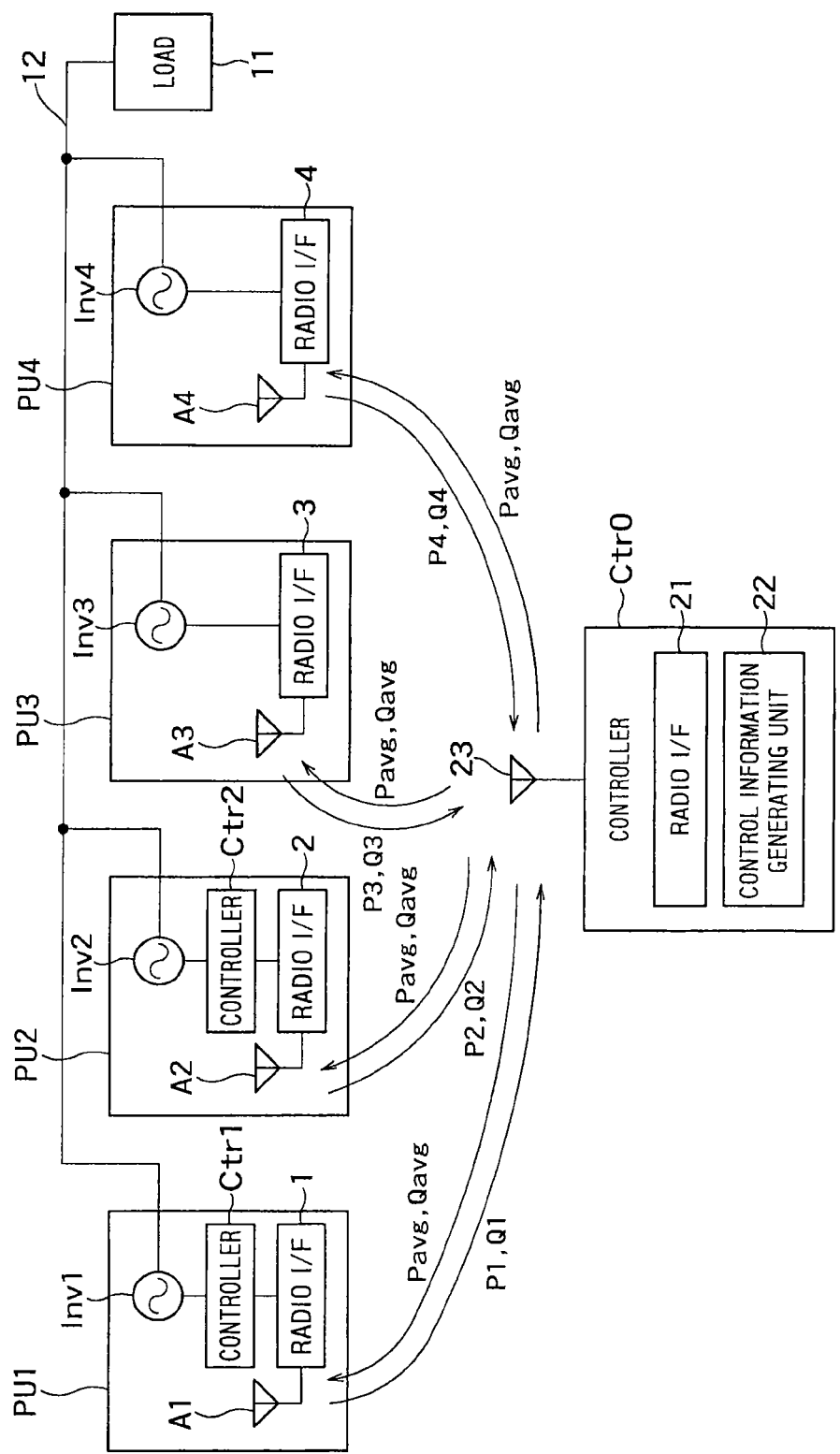
FIG. 1 is a block diagram of a power supply system according to a first embodiment.

FIG. 1 is an overall diagram of a power supply system according to a first embodiment.

The power supply system includes a load 11, power supply units PU1, PU2, PU3, and PU4, and a controller Ctr0.

The power supply unit PU1 includes an inverter Inv1, a controller Ctr1, a radio interface (I/F) 1, and a radio communication antenna A1.

The power supply unit PU2 includes an inverter Inv2, a controller Ctr1, a radio interface (I/F) 2, and a radio communication antenna A2.

The power supply unit PU3 includes an inverter Inv3, a radio interface (I/F) 3, and a radio communication antenna A3.

The power supply unit PU4 includes an inverter Inv4, a radio interface (I/F) 4, and a radio communication antenna A4.

Each of the radio interfaces includes a transmitting unit that modulates information with a radio modulation scheme and transmits the information, and a receiving unit that receives the information and demodulates the information.

The inverters Inv1 to Inv4 are electric power output units that are connected to each other in parallel through a power line 12 and supply electric power to the common load 11. The inverters Inv1 to Inv4 convert direct current that is supplied from a power source such as a battery into alternating current and output the alternating current to the load 11. The total output electric power of the inverters Inv1 to Inv4 is supplied to the load 11. Another electric power output unit such as a generator may be used instead of the inverter Inv.

Each of the power supply units PU1 to PU4 transmits operation information that is related to output electric power of the inverter, to the controller Ctr0 using the radio. In the embodiment, the operation information has electric power information including active power "P" and reactive power "Q" of the inverter. The electric power information may not include the reactive power "Q" and may include the only active power P. In addition, the operation information that is related to output electric power of the inverter may be a current value that is output from the inverter.

With the electric power information, for example, a rated value and a total operation time of the inverter may be transmitted. Alternatively, with the electric power information, remaining amount information of a battery may be transmitted when the battery is used as inverter input, and an electric generating capacity of a solar panel or a windmill may be transmitted when the solar panel or the windmill is used as an inverter input.

In the example of FIG. 1, the power supply unit PU1 transmits electric power information that includes active power P1 and reactive power Q1 of the inverter Inv1 to the controller Ctr0. The power supply unit PU2 transmits electric power information that includes active power P2 and reactive power Q2 of the inverter Inv2 to the controller Ctr0. The power supply unit PU3 transmits electric power information that includes active power P3 and reactive power Q3 of the inverter Inv3 to the controller Ctr0. The power supply unit PU4 transmits electric power information that includes active power P4 and reactive power Q4 of the inverter Inv4 to the controller Ctr0.

The controller Ctr0 includes an antenna 23 that is used to perform radio communication, a radio I/F 21 (a transmitting unit and a receiving unit), and a control information generating unit 22. The radio I/F 21 receives the electric power information from each of the power supply units PU1 to PU4. The control information generating unit 22 generates control information for each of the power supply units, from the electric power information. The radio I/F 21 transmits the control information to each of the power supply units. The inverter of each of the power supply units controls the output electric power using the control information that is received from the controller Ctr0. A state in which the power supply unit operates on the basis of the control information that is generated by the controller Ctr0 as described above is called a slave mode (first mode).

Here, as illustrated in FIG. 1, the control information may be an average value Pavg of active power output from all of the power supply units and an average value Qavg of reactive power output from all of the power supply units. Alternatively, the control information may be electric power (for example, P1 and Q1) output from a certain power supply unit. Alternatively, the control information may be a total value of active power that is output from all of the power supply units, and a total value of reactive power that is output from all of the power supply units. There are various contents of the control information and various methods of operating each of the power supply units on the basis of the control information, and the embodiment is not limited to a specific method.

An example in which each of the power supply units operates on the basis of control information is described below. A weighting factor is allocated to each of the power supply units in accordance with the corresponding output capacity (for example, maximum output enabled electric power, maximum output enabled current, etc.) beforehand. When it is assumed that the weighting factors are determined so that the total of weighting factors of each of the power supply units becomes 1, each of the power supply units outputs electric power that is determined by "average value Pavg×the own weight×the number of operating power supply units (=4)". When the control information includes the total value of the active power P1 to P4, each of the power supply units may determine electric power to be output, using "total active power×the own weight". Such a described case is just an example, and an operation of each of the power supply units may be determined using another method.

It is noted that controllers Ctrl1 and Ctrl2 that respectively exist in the power supply unit PU1 and PU2 executes the controller function instead of the controller Ctr0 when the controller Ctr0 stops due to the failure, etc. It is noted that, in this case, communication between the power supply units can occur, and the detail are described in the embodiments that are described later.

As described above, in the embodiment, a balance of the output electric power of the plurality of power supply units can be improved by controlling each of the power supply units using the control information that is generated by the controller Ctr0.

In addition, in the embodiment, each of the power supply units PU1 to PU4 communicates only with the controller Ctr0, and the power supply units don't communicate with each other directly (unless the controller Ctr0 fails or stops). Therefore, a coordinated operation between the plurality of power supply units can be performed with a simple communication procedure.

Second Embodiment

Figure 2:
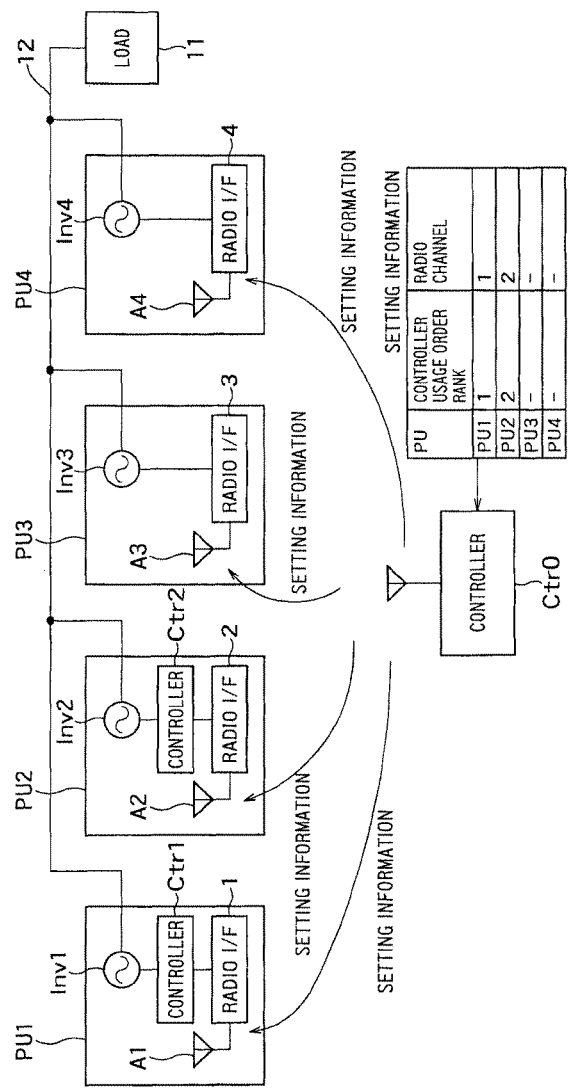
FIG. 2 is a block diagram of a power supply system according to a second embodiment.

FIG. 2 is a diagram illustrating a power supply system according to a second embodiment. The same symbols are given to elements that are the same as or corresponding to those of FIG. 1, and duplicate description will be omitted except for enhanced processing. It is noted that illustration of an internal block of the controller Ctr0 is omitted.

In the controller Ctr0, setting information is written that includes the number of power supply units that constitute the power supply system, usage order rank between power supply units respectively including the controller functions out of the power supply units, and information on radio channels that are used by the power supply units respectively including the controller functions. The radio channels that are respectively used by the power supply units are different. For example, the radio channels are different each other in term of usage resource such as a frequency, a time slot, or a space encoding. The controller Ctr0 stores the setting information in an internal storage or an external storage that the controller Ctr0 can access. The controller Ctr0 transmits the setting information to all of the power supply units. Each of the power supply units stores the received setting information in an internal storage or an external storage that the power supply unit can access.

In the example of FIG. 2, the order rank of the power supply unit PU1 is 1, and the order rank of the power supply unit PU2 is 2. This indicates that, in a case in which the controller Ctr0 stops, the power supply unit PU1 is used as a next controller.

As described above, when each of the power supply units grasps information on the usage order rank of the controllers and the radio channels beforehand, the power supply unit PU1 can swiftly operate as the controller after stoppage of the controller Ctr0 is detected. That is, when the controller Ctrl1 of the power supply unit PU1 takes over the controller function from the controller Ctr0, the controller Ctrl1 performs an operation that is similar to the operation of the controller Ctr0 according to the first embodiment.

In addition, when the controller function is taken over from the controller Ctr0 to the power supply unit PU1, each of the power supply units PU2 to PU4 swiftly establishes communication or connection with the power supply unit PU1 to allow communication to be performed.

Third Embodiment

Figure 3:
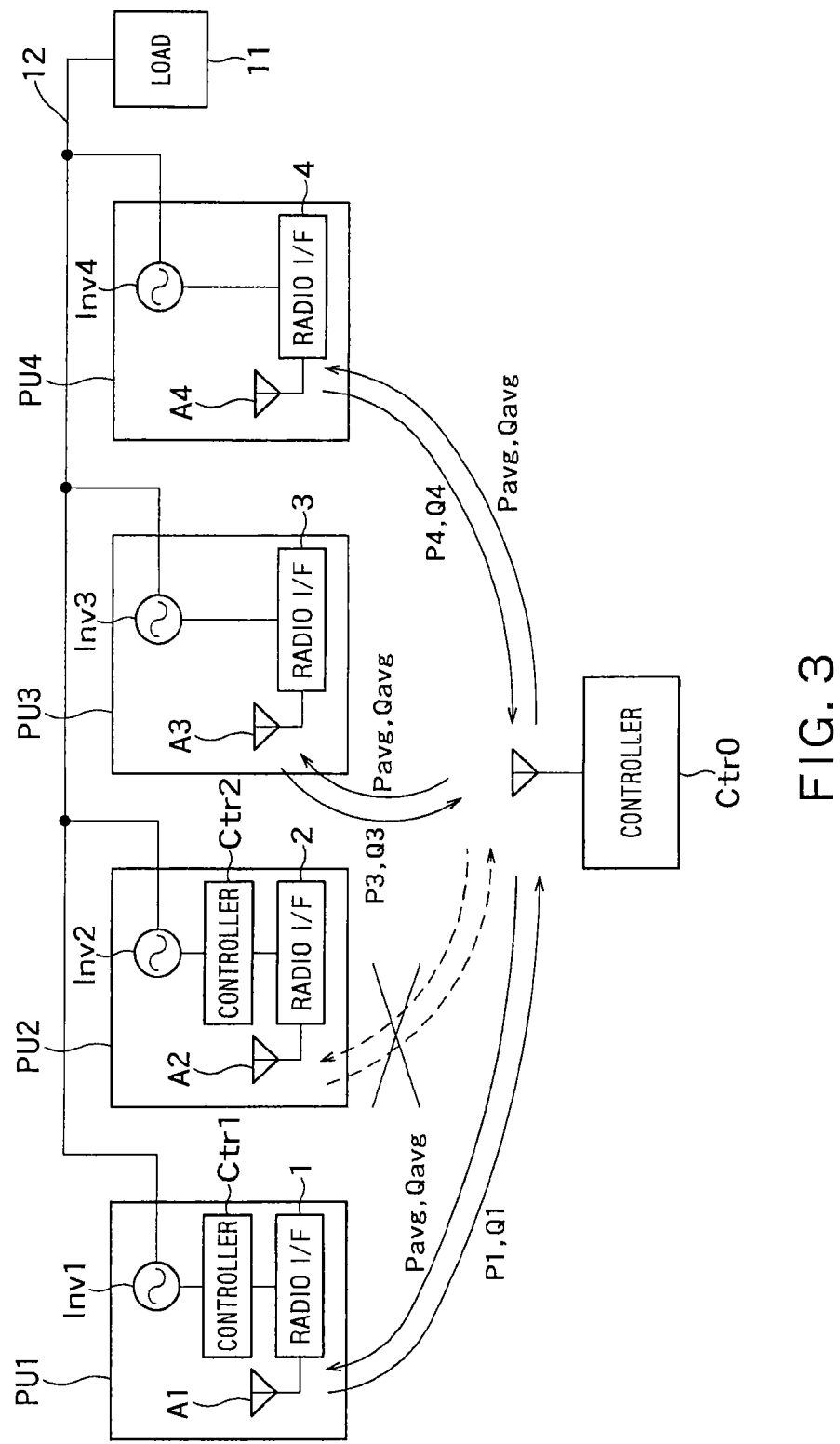
FIG. 3 is a block diagram of a power supply system according to a third embodiment.

FIG. 3 is a diagram illustrating a power supply system according to a third embodiment. The same symbols are given to elements that are the same as or corresponding to that of FIG. 1, and duplicate description will be omitted except for enhanced processing.

In the first embodiment, the operation of the power supply system in a steady state is described, and an operation is described below in which a communication quality between the power supply unit and the controller Ctr0 is reduced. As an example, a case is described in which a communication quality between the power supply unit PU2 and the controller Ctr0 is reduced. The similar operation can be applied to even a case in which a communication quality between the controller Ctr0 and the other power supply units is reduced.

The power supply unit PU2 measures a communication quality such as a communication error rate or communication delay. When the communication error rate or communication delay exceeds a first threshold value that is set beforehand (when the communication quality falls below a first reference value), the power supply unit PU2 determines that the communication quality is reduced, and the process proceeds from the slave mode to an autonomous mode (second mode).

In the autonomous mode, the power supply unit PU2 autonomously controls the own output electric power, regardless of the control information from the controller. As a method of the autonomous control, the droop control is common. In the droop control, on the basis of information on active power and reactive power, an output frequency "ω" is controlled based on the active power and the output voltage "V" is controlled based on the reactive power. It is noted that a circuit that determines the communication quality may be included in the inverter or the radio I/F, and the circuit may exist separately from the inverter and the radio I/F as an independent circuit.

In the determination of the communication quality, a communication error rate or communication delay when electric power information or control information are transmitted and received may be used, and the determination may be performed by transmitting and receiving a radio beacon apart from the pieces of information. As described above, when the process proceeds to the autonomous mode in a case in which the communication quality is reduced, instability of the power supply system can be avoided.

At this time, in the controller Ctr0, reduction of the communication quality between the controller Ctr0 and the power supply unit PU2 is detected, and transmission of the control information to the power supply unit PU2 may be stopped until the communication quality is recovered.

As described above, in the embodiment, when the communication quality between the power supply unit and the controller Ctr0 is reduced, the process proceeds to the autonomous mode, so that instability of the power supply system can be avoided.

Fourth Embodiment

In the third embodiment, reduction of the communication quality is detected at a time at which the communication error rate or the communication delay exceeds the first threshold value. In the embodiment, another threshold value that is smaller than the first threshold value is set, the reduction of the communication quality is detected at a time at which the communication error rate or the communication delay exceeds the other threshold value.

At the time at which the communication error rate or the communication delay exceeds the other threshold value, the power supply unit (for example, the power supply unit PU2) reduces the amount of information to be communicated and changes the radio modulation scheme to a scheme having higher reliability (for example, changes the scheme from 16 QAM to QPSK). As a result, the communication error rate or the communication delay can be improved, and at least the electric power information and control information are surely transmitted and received. It is desirable that at least electric power information and the control information are included in the information to be communicated. The radio modulation scheme may be merely changed without reducing an amount of the information to be communicated.

As described above, in the embodiment, even when the communication quality between the power supply unit and the controller Ctr0 is reduced, communication of minimum required information can be surely continued by narrowing down the amount of information.

Fifth Embodiment

In the fourth embodiment, the radio modulation scheme is changed when the communication quality is reduced, and in this embodiment, when electric power that is output by the power supply unit increases, an amount of information to be communicated is reduced, and the radio modulation scheme is changed to a scheme that is stronger against noise.

In a case in which supply electric power to the load is large, and output of a power supply unit becomes large depending on the size of the electric power, it is probable that electric power that is output from a certain power supply unit exceeds the rated power unless an output electric power balance between the power supply units is kept highly accurately. When communication of at least the electric power information is secured, the desirable electric power balance between all of the power supply units can be maintained and the possibility of the output electric power exceeding the rated power can be reduced.

Therefore, when electric power that is output by the power supply unit (for example, the active power P2 of the power supply unit PU2) exceeds the threshold value, the controller Ctr0 reduces an amount of information to be communicated with the power supply unit and changes the radio modulation scheme. At this time, it is desirable that at least the electric power information and the control information are included in the information to be communicated. The radio communication scheme may be merely changed without reducing the amount of the information.

As described above, in the embodiment, when large electric power is output, output of electric power by the power supply unit, which exceeds the rated power can be avoided by using the radio communication scheme by which communication can be surely performed.

Sixth Embodiment

Figure 4:
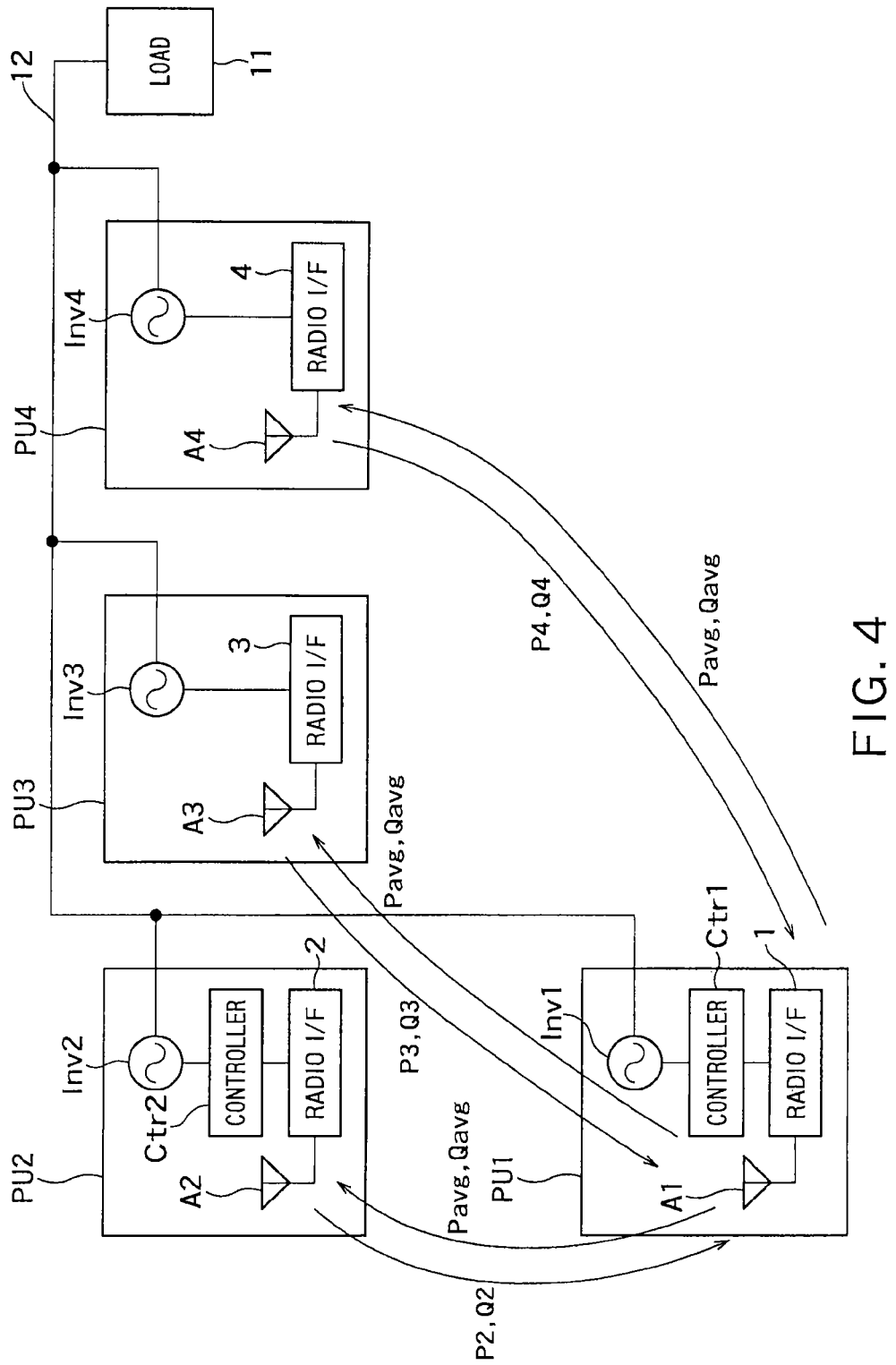
FIG. 4 is a block diagram of a power supply system according to a sixth embodiment.

FIG. 4 is a diagram illustrating a power supply system according to a sixth embodiment. The same symbols are given to elements that are the same as or corresponding to that of FIG. 1, and duplicate description will be omitted except for enhanced processing.

In this embodiment, an operation when the controller Ctr0 stops due to the failure is described.

When the controller Ctr0 stops, each of the power supply units PU1 to PU4 cannot communicate with the controller Ctr0. Therefore, as described in the third embodiment, reduction of the communication quality is detected, and in each of the power supply units, the process proceeds to the autonomous mode once.

After that, by the setting information that is notified beforehand (see FIG. 2), the power supply unit PU1 having the highest usage order rank takes over the controller function from the controller Ctr0, and starts the controller operation. The controller Ctr1 of the power supply unit PU1 establishes communication with each of the power supply units PU2 to PU4, receives the electric power information, generates control information, and transmits the control information to each of the power supply units. Each of the power supply units PU2 to PU4 operates in the slave mode in which the power supply unit PU1 is set as the controller. On the other hand, in the power supply unit PU1, the output electric power is adjusted on the basis of electric power information of the own inverter Inv1 and electric power information that is received from each of the power supply units PU2 to PU4. This can be also an aspect of the slave mode. It is noted that the controller Ctr1 generates control information of the inverter Inv1 of the power supply unit PU1, and the inverter Inv1 may operate on the basis of the control information.

As described above, in the embodiment, when the controller fails, output electric power control by the slave mode can be continued by taking over a controller function having the highest priority level.

Seventh Embodiment

Figure 5:
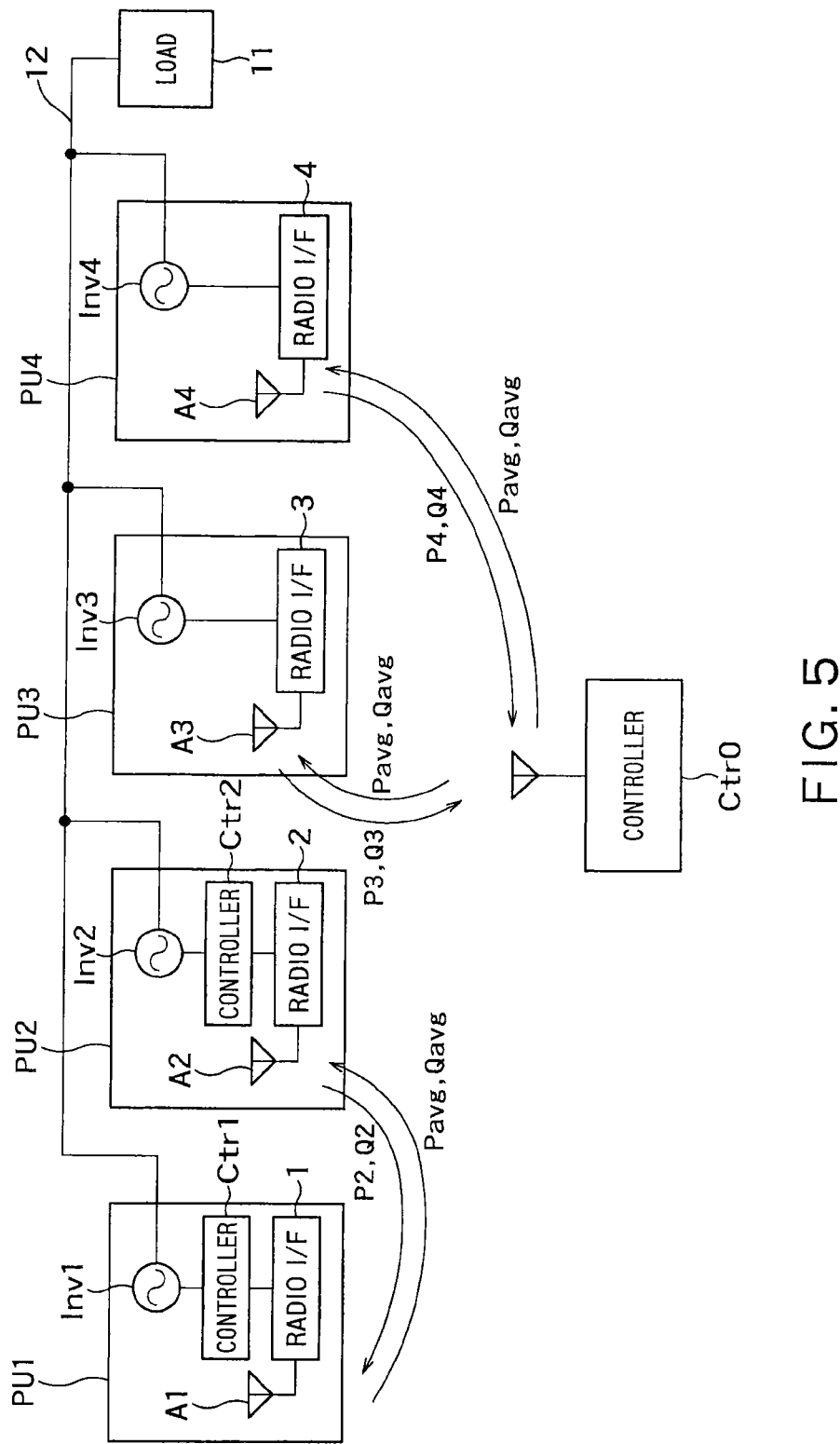
FIG. 5 is a block diagram of a power supply system according to a seventh embodiment.

FIG. 5 is a diagram illustrating a power supply system according to a seventh embodiment. The same symbols are given to elements that are the same as or corresponding to that of FIG. 1, and duplicate description will be omitted except for enhanced processing.

In the embodiment, an operation when there are a plurality of controllers is described.

It is assumed that the communication quality between the controller Ctr0 and each of the power supply units PU1 and PU2 is reduced. In this case, as described above, in each of the power supply units PU1 and PU2, the process proceeds to the autonomous mode once. In the power supply unit PU1, the process proceeds to the controller operation because the power supply unit PU1 has the highest controller usage order rank (see FIG. 2), and the power supply unit PU1 tries to establish communication with each of the other power supply units PU2, PU3, and PU4. The communication of the controller Ctr0 with each of the power supply units PU3 and PU4 is not interfered with because the power supply unit PU1 performs the communication using a radio channel that is different from that of the controller Ctr0.

Each of the power supply units PU3 and PU4 does not communicate with the power supply unit PU1 because communication between the controller Ctr0 and each of the power supply units PU3 and PU4 has been already established. On the other hand, in the power supply unit PU2, communication can be established in response to an access from the power supply unit PU1 because the power supply unit PU2 is not in the slave mode for the controller Ctr0 (the process has proceeded to the autonomous mode). The power supply unit PU2 that has established communication with the power supply unit PU1 operates in the slave mode in which the power supply unit PU1 is set as the controller.

It is noted that, in FIG. 5, when it is assumed that the communication quality between the power supply unit PU2 and the controller Ctr0 is excellent, that is, communication is established, the power supply unit PU2 does not communicate with the power supply unit PU1. At this time, the power supply unit PU1 cannot communicate with any of the other power supply units and operates in the autonomous mode.

As described above, in the embodiment, the plurality of controllers can operate side by side.

Eighth Embodiment

Figure 6:
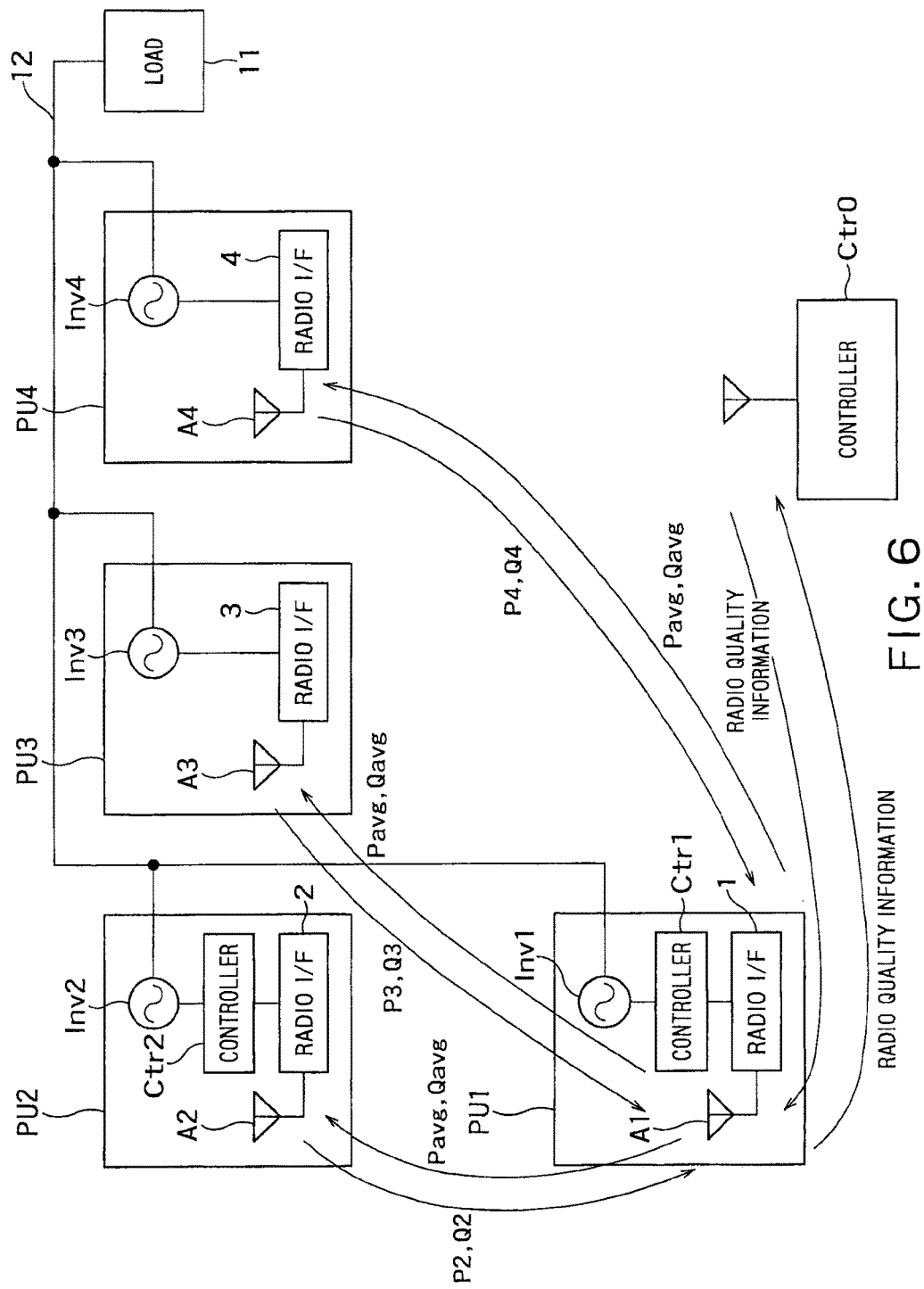
FIG. 6 is a block diagram of a power supply system according to an eighth embodiment.

FIG. 6 is a diagram illustrating a power supply system according to an eighth embodiment. The same symbols are given to elements that are the same as or corresponding to that of FIG. 1, and duplicate description will be omitted except for enhanced processing.

In this embodiment, an operation when the controller Ctr0 returns in a time period in which the power supply unit PU1 operates as a controller is described.

As a simple operation example, the controller Ctr0 may be used as the controller unconditionally as long as a measurement value of each of the power supply unit PU1 and the controller Ctr0 is smaller than a second threshold value (the communication quality is a second reference value or more) because the priority of the controller Ctr0 is high. Alternatively, the controller Ctr0 can be always used as the new controller regardless of the communication quality. The second threshold value may be a value that is the same as the above-described first threshold value or the above-described other threshold value, and may be a value different from the values.

As another method, the following method can be used.

First, the returned controller Ctr0 tries to establish communication with all of the power supply units PU1 to PU4. At this time, the controller Ctr0 obtains information that is related to a radio quality through communication with each of the power supply units PU1 to PU4.

After that, the radio quality information is received and transmitted from and to the controller Ctr0 and the power supply unit PU1. At this time, one of the power supply unit PU1 and the controller Ctr0, in which communication with the larger number of power supply units can be established, is used as the next controller. As a result, the number of power supply units in the autonomous mode is reduced (the number of power supply units that operate in the slave mode is increased), and an output electric power balance between the power supply units can be improved.

For example, for each of the power supply unit PU1 and the controller Ctr0, the communication quality such as the communication error rate or the communication delay is measured between each of the power supply unit PU1 and the controller Ctr0, and each of the power supply units PU1 to PU4. In addition, the number of power supply units is counted in which the measurement value is smaller than a third threshold value (the communication quality is a third reference value or more). It is noted that "1" may be counted unconditionally because the power supply unit PU1 is not needed to measure the communication quality of the own unit. The both count values are compared, and the larger count value of the power supply unit PU1 or the controller Ctr0 is selected as the next controller. The third threshold value may be a value that is the same as the above-described first threshold value, the second threshold value, or the other threshold value, and may be a value that is different from the values.

At this time, as a threshold value that is used to determine the communication error rate or the communication delay (communication quality) between the controller Ctr0 and each of the power supply units PU1 to PU4, a threshold that is smaller than the third threshold value may be used. Therefore, the determination reference is tightened, and the controller is changed only when a controller returns that has priority higher than that of the power supply unit PU1 and has a high communication quality. As a result, the controller is not frequently changed, which allows the power supply system to operate stably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power supply unit that outputs electric power to a load together with at least one other power supply unit and performs communication with a controller, comprising:
   a transmitting unit configured to transmit operation information to the controller by radio, the operation information being information on electric power output to the load;
   a receiving unit configured to receive control information from the controller by radio;
   an electric power output unit configured to select one mode among a first mode to control output electric power based on the control information and a second mode to control the output electric power autonomously regardless of the control information and execute the selected mode;
   a first controller capable of executing a control function and thus configured to:
      receive operation information from the other power supply unit by radio which is information on electric power output to the load from the other power supply unit,
      generate control information to control the other power supply unit based on the operation information, and
      transmit the control information to the other power supply unit by radio; and
   a storage configured to store setting information related to priorities of a plurality of controllers including the first controller and the controller, and wherein
   the first controller establishes communication with the other power supply unit operating in the second mode and executes the control function when all the controllers having higher priority are unavailable or when communication quality with all the controllers having the higher priority becomes less than a first reference value, and
   the electric power output unit controls the output electric power based on operation information received from the other power supply unit.

2. The power supply unit according to claim 1, further comprising:
   a measuring unit configured to measure a communication quality for the controller, and wherein
   the electric power output unit executes the first mode when the communication quality is a first reference value or more, and executes the second mode when the communication quality is less than the first reference value.

3. The power supply unit according to claim 2, wherein the measuring unit measures a communication error rate or communication delay as the communication quality.

4. The power supply unit according to claim 2, wherein the electric power output unit switches the second mode to the first mode when the communication quality becomes the first reference value or more in the execution of the second mode.

5. The power supply unit according to claim 1, wherein the setting information includes information on a radio channel used by the first controller,
   the radio channel is different from a radio channel used by the controller, and
   communication with the other power supply unit is performed using the radio channel indicated by the setting information.

6. The power supply unit according to claim 1, wherein the first controller does not execute the control function when communication with the other power supply unit is not allowed to be established with a communication quality of the first reference value or more, and
   the electric power output unit executes the second mode.

7. The power supply unit according to claim 1, wherein the first controller stops the control function when communication with the controller having priority that is higher than that of the first controller is allowed with a communication quality of a second reference value or more in the execution of the control function, and
   the electric power output unit executes the first mode with the controller having the higher priority.

8. The power supply unit according to claim 7, wherein the first controller detects that communication with the controller having priority that is higher than that of the first controller is allowed in the execution of the control function, and
   the first controller performs comparison between a number of power supply units with which the first controller is allowed to perform communication with a communication quality of a third reference value or more and a number of power supply units with which the controller having the higher priority is allowed to perform communication with a communication quality of the third reference value or more, and stops or continues the control function based on a result of the comparison.

9. The power supply unit according to claim 1, wherein an amount of information to be communicated with the controller and a radio modulation scheme are determined to be changed in accordance with the communication quality for the controller.

10. The power supply unit according to claim 1, wherein an amount of information to be communicated with the controller and the radio modulation scheme are determined to be changed in accordance with magnitude of electric power that is output to the load.

11. A power supply system comprising:
   a controller that performs communication with a plurality of power supply units each of which outputs electric power to a load, the controller comprising:
   a receiving unit configured to receive operation information from the power supply units by radio, the operation information being information on electric power output to the load from the power supply units, respectively, a control information generating unit configured to generate control information to control the power supply units based on the operation information, and a transmitting unit configured to transmit the control information to the power supply units by radio; and a power supply unit that outputs electric power to the load together with at least one other power supply unit and performs communication with the controller, the power supply unit comprising, a transmitting unit configured to transmit operation information to the controller by radio, the operation information being information on electric power output to the load, a receiving unit configured to receive control information from the controller by radio, an electric power output unit configured to select one mode among a first mode to control output electric power based on the control information and a second mode to control the output electric power autonomously regardless of the control information and execute the selected mode;

a first controller capable of executing a control function and thus configured to:

receive operation information from the other power supply unit by radio which is information on electric power output to the load from the other power supply unit, generate control information to control the other power supply unit based on the operation information, and transmit the control information to the other power supply unit by radio; and a storage configured to store setting information related to priorities of a plurality of controllers including the first controller and the controller, and wherein the first controller establishes communication with the other power supply unit operating in the second mode and executes the control function when all the controllers having higher priority are unavailable or when communication quality with all the controllers having the higher priority becomes less than a first reference value, and the electric power output unit controls the output electric power based on operation information received from the other power supply unit.

\* \* \* \* \*